United States Patent Office 2,726,251
Patented Dec. 6, 1955

2,726,251

1,8-DIHYDROXY-5-NITRO-4-ANILINOANTHRA-QUINONE COMPOUNDS

Joseph B. Dickey and James M. Straley, Kingsport, Tenn., assignors to Eastman Kodak Company, Rochester, N. Y., a corporation of New Jersey No Drawing. Application August 17, 1951,
Serial No. 242,427

8 Claims. (Cl. 260—380)

This invention relates to new anthraquinone compounds and their application to the art of dyeing or coloring. More particularly it relates to new anthraquinone compounds which color textile materials made of or containing a cellulose alkyl carboxylic acid ester having two to four carbon atoms in the acid groups thereof, especially cellulose acetate textile materials, blue shades. The invention is also directed to a process for preparing the new anthraquinone compounds.

As well known to those skilled in the art there is a need for dyestuffs which have a satisfactory degree of affinity for cellulose acetate textile materials and which color these materials in desirable blue shades which have satisfactory fastness with respect to both light and gas. Anthraquinone dyestuffs are available which color cellulose acetate textile materials blue shades which have reasonably satisfactory fastness to light but which leave much to be desired with respect to their resistance to gas fading. Similarly, azo dyestuffs are available which color cellulose acetate textile materials blue shades which have excellent resistance to gas fading but which leave much to be desired with respect to their fastness to light.

The known anthraquinone dyestuffs which have satisfactory affinity for cellulose acetate textile materials and which color these materials blue shades having satisfactory fastness to light almost without exception leave much to be desired with respect to their resistance to gas fading.

On prolonged exposure to burnt gas fumes or to ordinary city atmosphere conditions the dyeings obtained on cellulose acetate textile materials with these dyes undergo disagreeable color changes and/or a loss of strength. Depending upon the particular dyestuff, the dyeing may change from a blue shade to a reddish-blue or even a pink color. Gas fading is also known as acid fading and the two terms, as used herein, are intended to be synonymous. Efforts have been made to increase the resistance of the dyeings to gas fading by the use of inhibitors but this method is not particularly satisfactory because the application of such inhibitors is usually expensive and often inconvenient. Additionally, the effect is not permanent.

It is an object of our invention to provide new anthraquinone dyestuffs having good affinity for cellulose alkyl carboxylic acid esters, having two to four carbon atoms in the acid groups thereof, textile materials and dyeing said textile materials in level blue shades which have excellent fastness to both light and gas. Another object is to provide a satisfactory process for the preparation of the new anthraquinone dyestuffs of the invention. A particular object is to provide new anthraquinone dyestuffs which are especially of value for the dyeing of cellulose acetate textile materials.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

We have discovered that the new anthraquinone compounds having the probable general formula:

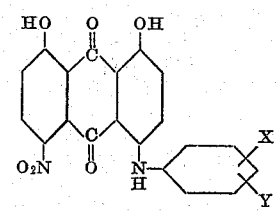

wherein X represents a monohydroxyalkyl group having three carbon atoms, a dihydroxyalkyl group having three carbon atoms, a —(OCH$_2$CH$_2$)$_n$—OH group, wherein $n$ represents 1, 2, 3, or 4, or a —(OCH$_2$CH$_2$)$_m$—O—R group, wherein $m$ represents 1, 2, or 3 and R represents an alkyl group having one to two carbon atoms and Y represents a hydrogen atom, a chlorine atom, a hydroxy group, a methoxy group or a methyl group are valuable dyes for coloring textile materials made of or containing a cellulose alkyl carboxylic acid ester having two to four carbon atoms in the acid groups thereof. These dye compounds when applied to the aforesaid materials give blue dyeings which have outstanding light and gas fastness properties. They are particularly of use for the coloration of cellulose acetate textile materials.

The remarkable resistance of the dyestuffs of the present invention to gas fading is shown by the fact that the dyeings obtained therewith on cellulose acetate textile materials undergo very little alteration in strength or shade even after exposure to as many as 6 AATCC gas-cycles. By contrast, various aminoanthraquinones such as 1,4-dimethylaminoanthraquinone, 1-methylamino-4-methoxyethylaminoanthraquinone, 1-methylamino-4-β-hydroxyethylaminoanthraquinone, 1,4-diaminoanthraquinone, 1,4,5,8,-tetraaminoanthraquinone, 1,4-di-β-hydroxyethylamino-5,8-dihydroxyanthraquinone and 1-amino-4-methylaminoanthraquinone-2 carboxylic amide, which are used extensively to color cellulose acetate textile materials, are markedly changed after only 1 AATCC gas-cycle.

Similarly the outstanding light-fastness of our new dyestuffs is apparent from the fact that the dyeings obtained therewith on cellulose acetate textile materials show little fading after 40 to 60 hours' exposure on the Fade-O-Meter light-fastness apparatus. The significance of this will be apparent from the fact that dyeings on cellulose acetate which show little fading after 20 hours' exposure on the Fade-O-Meter light-fastness apparatus are considered good.

We are aware that U. S. Patent 2,480,269 discloses anthraquinone dyestuffs obtained by reacting polyhydroxy polynitro-anthraquinone compounds such as, for example, 4,8-dinitro-anthrarufin, 4,5-dinitro-chrysazin or 4,8-dinitro-anthrachrysone, with a primary aromatic amine such as aniline, toluidine, amino-ethylbenzene, amino-acetophenone or amino-phenol, for example. However this patent does not disclose the dyestuffs of the present application and further the dyestuffs of the present application are superior to the dyestuffs of said patent. One, the dyestuffs of the present application have better affinity for cellulose acetate textile materials and two, in general, they give more light-fast dyeings on cellulose acetate textile materials than do the dyestuffs of U. S. Patent 2,480,269.

The new anthraquinone compounds of the invention are prepared by condensing 1,8-dihydroxy-4,5-dinitroanthraquinone with a primary arylamine having the formula:

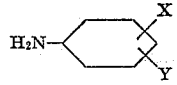

wherein X and Y have the meaning previously assigned to them. The reaction can be carried out using an excess of the amine, usually 5 to 10 parts by weight of the amine to 1 part of 1,8-dihydroxy-4,5-dinitroanthraquinone, with or without a small amount of water being present. Also, the reaction can be carried out in the presence of an organic solvent or diluent which does not undergo reaction with the reactants. When an organic diluent or solvent is present, smaller amounts of the amine are required than when no organic diluent or solvent is employed. Although water or an organic solvent or diluent need not be present, their use is preferred. Organic solvents or diluents that can be employed include, for example, nitrobenzene, o-nitrotoluene, quinoline, quinaldine, ethyl alcohol, butyl alcohol, amyl alcohol, pyridine, 2-methyl-5-ethylpyridine, a phenol such as phenol or m-cresol, an N,N-di-(low carbon alkyl) amide of a normal fatty acid having one to three carbon atoms such as, for example, N,N-dimethyl formamide, N,N-diethyl formamide, N,N-diisopropyl formamide, N,N-dimethyl acetamide, N,N-diethyl acetamide, N,N-dipropyl acetamide and N,N-dimethyl propionamide, a glycol such as, for example, ethylene glycol, propylene glycol (propandiol-1,2), trimethylene glycol (propandiol-1,3), alpha butylene glycol (butandiol-1,2), butandiol-1,3, diethylene glycol and an ether glycol such as, for example, ethyleneglycol monomethyl ether (Methyl Cellosolve), ethyleneglycol monoethyl ether (Cellosolve), ethyleneglycol monobutyl ether (Butyl Cellosolve), diethyleneglycol monobutyl ether (Butyl Carbitol), diethylene glycol monoethyl ether (Carbitol) and diethylene glycol monomethyl ether (Methyl Carbitol).

Other than selecting a temperature high enough to effect the desired reaction and not so high as to cause the formation of an appreciable amount of undesirable by-products, the exact temperature employed does not appear to be critical. Thus, temperatures ranging from about 25° C. to about 200° C. can be used although we prefer to use temperatures from about 100° C. to 170° C. Ordinarily temperatures lower than about 100° C. are not used as too long a reaction time is required when such temperatures are employed.

Typical of the primary arylamines used in the preparation of the anthraquinone compounds of the invention are: o-(CHOHCH$_2$CH$_2$OH)aniline, p-(CHOHCH$_2$CH$_2$OH)-aniline, o-(β-hydroxyethoxy)aniline, p-(β-hydroxyethoxy)aniline, o-(β-hydroxyethoxyethoxy)aniline, m-(β-hydroxyethoxyethoxy)aniline, p-(β-hydroxyethoxyethoxy)aniline, o-(β-hydroxyethoxyethoxyethoxy)aniline, m-(β-hydroxyethoxyethoxyethoxy)aniline, p-(β-hydroxyethoxyethoxyethoxy)aniline, o-(β-hydroxyethoxyethoxyethoxy)aniline, p-(β-hydroxyethoxyethoxyethoxy)aniline, o-(β-methoxyethoxy)aniline, p-(β-ethoxyethoxy)aniline, o-(β-methoxyethoxyethoxy)aniline, p-(β-methoxyethoxyethoxy)aniline, o-(β-ethoxyethoxyethoxy)aniline, p-(β-ethoxyethoxyethoxy)aniline, o-(β-methoxyethoxyethoxy)aniline, p-(β-methoxyethoxyethoxy)aniline, o-(β-ethoxyethoxyethoxy)aniline, p-(β-ethoxyethoxyethoxy)aniline, o-(CH$_2$CH$_2$CH$_2$OH)aniline, p-(CH$_2$CH$_2$CH$_2$OH)-aniline, 2-methoxy-5-(CH$_2$CH$_2$CH$_2$OH)aniline, 2-hydroxy-5-(CH$_2$CH$_2$CH$_2$OH)aniline, 2-chloro-5-(CH$_2$CH$_2$CH$_2$OH)aniline, 2-methyl-5-(CH$_2$CH$_2$CH$_2$OH)-aniline,

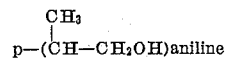

o-(CH$_2$CHOHCH$_3$)aniline, p-(CH$_2$CHOHCH$_3$)aniline, p-(CHOHCH$_2$CH$_3$)aniline, o-(CH$_2$CHOHCH$_2$OH)aniline, p-(CH$_2$CHOHCH$_2$OH)aniline and

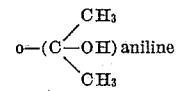

The following examples illustrate the anthraquinone compounds of our invention and the manner in which they are prepared. The term parts when used in the examples refers to parts by weight.

*Example 1*

10 parts of 1,8-dihydroxy-4,5-dinitroanthraquinone, 16 parts of p-(β-hydroxyethoxyethoxyethoxy)aniline and 100 parts of quinoline are heated together, with stirring, at 150° C.-155° C. for two hours. The reaction mixture is allowed to cool and is then poured into 400 parts of 15% aqueous hydrochloric acid and the resulting mixture is filtered. The dye product obtained on the filter is ground with 50 parts of 15% aqueous hydrochloric acid and the mixture thus obtained is filtered and the dye product obtained on the filter is washed with water until neutral. 14 parts of the dye product are obtained as a blue powder. The dye compound thus obtained has the formula:

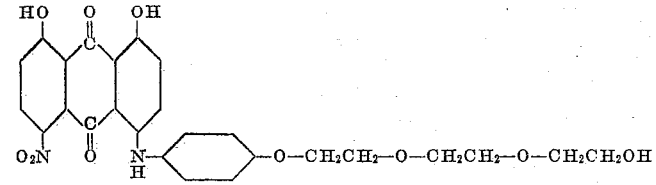

*Example 2*

10 parts of 1,8-dihydroxy-4,5-dinitroanthraquinone, and 25 parts of o-(β-hydroxyethoxyethoxyethoxy)aniline are heated together at 130° C.-135° C., with stirring, for four hours. The reaction mixture thus obtained is diluted with 400 parts of 66% aqueous ethanol at 60° C.-70° C., and filtered. The filter-cake is ground with 100 parts of cold 15% aqueous hydrochloric acid and the mixture resulting is filtered. The dye product thus obtained on the filter is washed with cold water until neutral. After drying under vacuum at 50° C. a yield of 11 parts of dye is obtained as a blue powder melting at about 84° C.

*Example 3*

2 grams of 1,8-dihydroxy-4,5-dinitroanthraquinone, 2 grams of p-(CH$_2$CH$_2$CH$_2$OH)aniline and 15 cc. of ethyleneglycol monomethyl ether are refluxed together for six hours. The reaction mixture is then poured into 100 cc. of 8.5% aqueous hydrochloric acid and the dye compound which precipitates is recovered by filtration, washed with water until neutral and dried. The dye compound thus obtained has the formula:

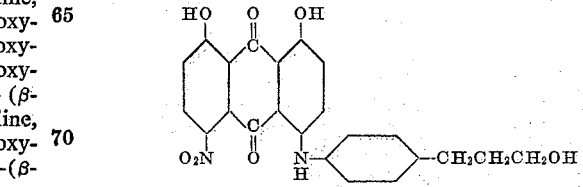

*Example 4*

5 parts of 1,8-dihydroxy-4,5-dinitroanthraquinone, 9 parts of p-(β-hydroxyethoxyethoxyethoxy) aniline and 70 parts of nitrobenzene are heated together at 155° C.–160° C., with stirring, for eight hours. Upon cooling, the reaction mixture is diluted with 300 parts of naphtha and filtered. The sticky dye cake obtained on the filter is ground with 15% aqueous hydrochloric acid and the mixture resulting is in turn filtered. The dye product obtained on the filter is washed with water until neutral and then dried. A yield of 4 parts of dye product is thus obtained.

*Example 5*

2 grams of 1,8-dihydroxy-4,5-dinitroanthraquinone, 5 grams of p-(β-ethoxyethoxyethoxy)aniline and 15 cc. of ethyleneglycol monomethyl ether are refluxed together for six hours. The reaction mixture is then cooled and poured into 100 cc. of cold 10% aqueous hydrochloric acid, with stirring. The dye compound which precipitates is recovered by filtration, washed with water until neutral and dried.

*Example 6*

11 parts of 1,8-dihydroxy-4,5-dinitroanthraquinone, 8 parts of o-(β-hydroxyethoxyethoxyethoxy)aniline, 3 parts of anhydrous sodium acetate and 50 parts of diethylene glycol monomethyl ether are heated together at 155° C.–165° C., with stirring, for three hours. Upon cooling the reaction mixture is poured into 750 parts of water and filtered. The dye product obtained on the filter is ground with 50 parts of 15% aqueous hydrochloric acid and finally with 50 parts of 66% ethanol and filtered. 13 parts of a product identical with that obtained in Example 1 is thus obtained.

*Example 7*

20 parts of 1,8-dihydroxy-4,5-dinitroanthraquinone, 20 parts of water and 20 parts of p-(β-hydroxyethoxy)aniline are refluxed together with stirring for 2½ hours. Upon cooling, the reaction mixture is diluted with 450 parts of ethanol, filtered, and the filtrate poured into 3000 parts of 10% aqueous hydrochloric acid. The dye compound which precipitates is recovered by filtration and washed by slurrying with 500 parts of 5% aqueous hydrochloric acid and finally with water. The slurry mixture is filtered and the dye compound obtained on the filter is dried at 105° C. A yield of 24 parts of dye product is thus obtained. The dye compound of this example dyes cellulose acetate textile materials blue shades having excellent fastness to light and good fastness to gas although the fastness to gas is not as good as that of the products of Examples 1, 2, 4, and 6.

*Example 8*

10 parts of 1,8-dihydroxy-4,5-dinitroanthraquinone, 13 parts of o-(β-hydroxyethoxyethoxy)aniline and 100 parts of pyridine are heated together in an autoclave at 140° C.–150° C. for five hours. The cooled reaction mixture is worked up as described in Example 1. 14 parts of a dye product dyeing cellulose acetate textile materials blue shades having excellent fastness to light and good fastness to gas, although inferior in the latter respect to that of the product of Examples 1, 2, 4, and 6, are obtained.

*Example 9*

20 parts of 3-(aminophenyl)propanol-1 (prepared by nitrating the acetate of 3-phenylpropanol-1, reducing the nitro group to an amino group by treatment with hydrogen in the presence of Raney nickel catalyst and then removing the acetate group by hydrolysis) 10 parts of 1,8-dihydroxy-4,5-dinitroanthraquinone and 60 parts of the monomethyl ether of ethylene glycol are refluxed together at a temperature of 120° C.–124° C. for four hours while stirring. Upon cooling, the reaction mixture is poured into 500 parts of 10% aqueous hydrochloric acid, stirred 130 minutes at 50° C.–60° C., and filtered to recover the dye compound which precipitates. The dye compound obtained on the filter is washed with water until neutral and then dried. 14 parts of dye product are thus obtained.

*Example 10*

40 parts of 2-(aminophenyl)propanol-1 (prepared by nitrating the acetate of 2-phenylpropanol-1, reducing the nitro group to an amino group by treatment with hydrogen in the presence of Raney nickel catalyst and then removing the acetate group by hydrolysis), and 10 parts of 1,8-dihydroxy-4,5-dinitroanthraquinone are heated together with stirring at 135° C.–140° C. for three hours. Upon cooling, the reaction mixture is poured into 750 parts of 60% aqueous ethanol containing 35 parts of hydrogen chloride and stirred for two hours at 55° C.–60° C. The reaction mixture thus obtained is diluted with an equal volume of water and then filtered. The dye compound obtained on the filter is washed well with water and dried. 12.5 parts of dye product are thus obtained.

*Eample 11*

15 parts of 1-(aminophenyl)propanol-2 (prepared by nitrating the acetate of 1-phenylpropanol-2, reducing the nitro group to an amino group by treatment with hydrogen in the presence of Raney nickel catalyst and then removing the acetate group by hydrolysis), 7 parts of 1,8-dihydroxy-4,5-dinitroanthraquinone and 30 parts of N,N-dimethyl acetamide are heated together at 110° C.–115° C. for six hours, while stirring. The reaction mixture is worked up as described in Example 9 to obtain 10 parts of dye product.

*Example 12*

20 parts of 1-(aminophenyl)propanol-1 (prepared by nitration of propiophenone and then reducing both the nitro group and the ketone group by treatment with hydrogen in the presence of Raney nickel catalyst), 10 parts of 1,8-dihydroxy-4,5-dinitroanthraquinone and 50 parts of quinoline are heated at 155° C.–160° C. for four hours, while stirring. The reaction mixture resulting is cooled and then poured into 1000 parts of 10% aqueous hydrochloric acid and stirred for two hours at 155° C.–160° C. The dye compound formed is recovered by filtration, washed with dilute aqueous hydrochloric acid, then with water, and dried. 13 parts of dye product are thus obtained.

*Example 13*

10 parts of 1-(aminophenyl)-1,3-dihydroxypropane (prepared by nitrating the diacetate of 1-phenyl-1,3-dihydroxypropane, reducing the nitro group to an amino group by treatment with hydrogen in the presence of Raney nickel catalyst and then removing the acetate groups by hydrolysis), 5 parts of 1,8-dihydroxy-4,5-dinitroanthraquinone and 40 parts of ethyleneglycol monoethyl ether are heated together at 130° C.–150° C. for four hours, while stirring. Upon working up the reaction mixture in accordance with the procedure described in Example 1, 7.5 parts of dye product are obtained.

*Example 14*

10 parts of 1,8-dihydroxy-4,5-dinitroanthraquinone, 25 parts of 2-(aminophenyl)propanol-2 (prepared according to J. Chem. Soc., 1947, 808) and 65 parts of N,N-dimethyl formamide, heated together at 130° C.–135° C. for six hours, while stirring. Upon working up the reaction mixture in accordance with the procedure described in Example 9, 12 parts of dye product are obtained. The dye product thus obtained has the formula:

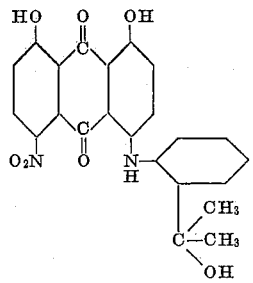

Example 15

5 parts of 1,8-dihydroxy-4,5-dinitroanthraquinone, 13 parts of 1-(aminophenyl)-2,3-dihydroxypropane (prepared by nitrating the diacetate of 1-phenyl-2,3-dihydroxypropane, reducing the nitro group to an amino group by treatment with hydrogen in the presence of Raney nickel catalyst and then removing the acetate group by hydrolysis) and 50 parts of nitrobenzene are heated together at 160° C.–165° C. for four hours while stirring. Upon cooling, the reaction mixture is poured into 500 cc. of 10% aqueous hydrochloric acid and the nitrobenzene is removed by steam distillation. The solid in the distillation flask consisting essentially of the dye product, is recovered by filtration, washed well with water, and dried. 5 parts of dye product are thus obtained.

Example 16

2 grams of 1,8-dihydroxy-4,5-dinitroanthraquinone, 3 grams of o-(β-hydroxyethoxyethoxyethoxy)aniline and 15 cc. of ethylene glycol monomethyl ether are refluxed together for six hours while stirring. The reaction mixture is then cooled and poured into 100 cc. of cold 10% aqueous hydrochloric acid with stirring. The dye compound which precipitates is recovered by filtration, washed with water until neutral, and dried.

Example 17

2 grams of 1,8-dihydroxy-4,5-dinitroanthraquinone, 0.4 cc. of water and 15 grams of p-(β-ethoxyethoxyethoxy)aniline are refluxed together for four hours while stirring. The hot reaction mixture is then diluted with 60 cc. of ethyl alcohol and refluxed into 60 cc. of 10% aqueous hydrochloric acid, while stirring, and allowed to cool. The dye compound which precipitates is recovered by filtration, washed until neutral with water and dried.

Example 18

2 grams of 1,8-dihydroxy-4,5-dinitroanthraquinone, 3 grams of o-(β-methoxyethoxyethoxy)aniline and 15 cc. of n-amyl alcohol are refluxed together for six hours. The reaction mixture is then cooled and poured into 100 cc. of cold 10% aqueous hydrochloric acid, with stirring. The dye compound which precipitates is recovered by filtration, washed until neutral with water and dried.

Example 19

2 grams of 1,8-dihydroxy-4,5-dinitroanthraquinone, 0.4 cc. of water and 13 grams of a mixture of o-($CH_2CH_2CH_2OH$)aniline and p-($CH_2CH_2CH_2OH$)aniline are heated together under refluxing conditions at 140° C. for four hours. Then the hot reaction mixture is diluted with 60 cc. of ethyl alcohol, refluxed and filtered while hot. The filtrate is poured into 60 cc. of cold 10% aqueous hydrochloric acid, with stirring, and allowed to cool. The dye compound formed is recovered by filtration, washed with hot water and dried.

The mixture of o- and p-($CH_2CH_2CH_2OH$)aniline used in the above reaction has a boiling point of 175° C.–180° C./6 mm. and was prepared by nitrating the acetate of

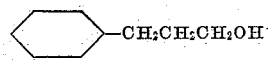

hydrolyzing the acetate and reducing the mixture of o- and p-($CH_2CH_2CH_2OH$)nitrobenzene with hydrogen in the presence of Raney nickel catalyst.

Example 20

2 grams of 1,8-dihydroxy-4,5-dinitroanthraquinone, 2 grams of o-($CH_2CH_2CH_2OH$)aniline and 15 cc. of ethyleneglycol monomethyl ether are reacted together in accordance with the procedure described in Example 3 to obtain a dye compound which colors cellulose acetate textile materials blue shades.

Example 21

By the use of 13 grams of m-($CH_2CH_2CH_2OH$)aniline in place of the mixture of o- and p-($CH_2CH_2CH_2OH$)anilines used in Example 19, 2 grams of a dye which colors cellulose acetate textile materials blue shades is obtained.

The m-($CH_2CH_2CH_2OH$)aniline used above was prepared by converting m-nitrobenzaldehyde to m-nitrocinnamic acid by heating with sodium acetate and acetic anhydride. The m-nitrocinnamic acid in turn was reduced by hydrogen in the presence of Raney nickel catalyst to m-aminophenylpropionic acid which in turn was reduced with lithium aluminum hydride to m-($CH_2CH_2CH_2OH$)aniline

Example 22

2 grams of 1,8-dihydroxy-4,5-dinitroanthraquinone and 13 grams of a mixture of o- and p-($CH_2CHOHCH_3$)aniline (boiling point 145° C.–150° C/4.5 mm.) are reacted together in accordance with the procedure described in Example 19 except that no water is used in the reaction. About 1.9 grams of a dye mixture which colors cellulose acetate textile materials blue shades is obtained.

The mixture of o- and p-($CH_2CHOHCH_3$)aniline used above is prepared by reducing phenylacetone, acetylating the resulting carbinol, nitrating the ester, deacetylating and then reducing the nitrated carbinol.

Example 23

2 grams of 1,8-dihydroxy-4,5-dinitroanthraquinone, 1.2 grams of a mixture of

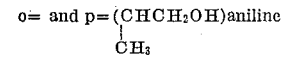

and 15 cc. of nitrobenzene are reacted together at 155° C. for five hours. The reaction mixture is steam distilled to remove the nitrobenzene and the residue remaining is digested with warm 10% aqueous hydrochloric acid and allowed to cool. The dye compound which precipitates is recovered by filtration, washed with water and dried. About 1.75 grams of a dye mixture which colors cellulose acetate textile materials blue shades is obtained.

The mixture of amines used in the above reaction was prepared by reacting styrene with carbon monoxide and hydrogen in an oxo reactor and acetylating the

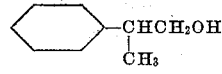

thus formed. This compound was then nitrated, reduced and the amino ester mixture resulting was hydrolyzed to remove the acetate grouping. The product thus obtained has a boiling point of 150° C.–154° C./4 mm.

Example 24

2 grams of 1,8-dihydroxy-4,5-dinitroanthraquinone, 0.4 cc. of water and 13 grams of p-($CHOHCH_2CH_2OH$)aniline are reacted together in accordance with the procedure described in Example 19. The dye compound thus obtained colors cellulose acetate textile materials blue shades.

The amine used in the above example was prepared as a viscous oil by nitrating the diacetate of 3-(phenyl)-1,3-propanediol with fuming nitric acid and acetic anhydride at 20° C.–30° C. The p-nitro ester reaction product separates as a solid when the nitration mixture is poured into ice water and is extracted with ethyl ether. Then the p-nitro ester compound is reduced with hydrogen in the presence of Raney nickel catalyst, and then upon hydrolysis of the ester compound the desired amine compound is obtained. The o-nitro ester isomer is obtained from the ether solution and is then similarly reduced and hydrolyzed to obtain o-(CHOHCH₂CH₂OH)aniline.

*Example 25*

2 grams of 1,8-dihydroxy-4,5-dinitroanthraquinone, 2 grams of 2-methoxy-5-(CH₂CH₂CH₂OH)-aniline (melting point 66° C.– 67° C.) and 20 cc. of n-amyl alcohol were refluxed together for six hours. Upon working up the reaction mixture in accordance with the procedure described in Example 3 a dye compound is obtained which colors cellulose acetate textile materials blue shades.

The amine used in the above reaction was prepared by nitrating p-methoxybenzaldehyde and converting the compound thus obtained to

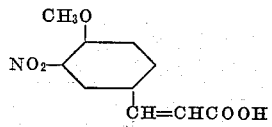

by means of the Perkin's reaction, the unsaturated acid compound thus obtained was then reduced with hydrogen in the presence of Raney nickel catalyst to the saturated acid which in turn was reduced with lithium aluminum hydride to give the desired amine compound.

*Example 26*

2 grams of 1,8-dihydroxy-4,5-dinitroanthraquinone, 2 grams of a mixture of o- and p-(CH₂CHOHCH₂OH)aniline and 20 cc. of quinoline are reacted together at 150° C. for five hours. The reaction mixture is then poured into 150 cc. of 8.5% aqueous hydrochloric acid and the dye compound which precipitates is recovered by filtration, washed with hot water until neutral and dried. The dye compound thus obtained colors cellulose acetate textile materials blue shades.

The mixture of o- and p-(CH₂CHOHCH₂OH)aniline used in the above example was prepared by reacting phenylmagnesium bromide with

and acetylating the resulting

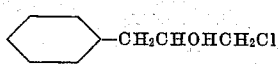

first with potassium acetate in acetic acid and then with acetic anhydride. The resulting diacetate of 1-phenyl-2,3-propanediol was then nitrated and hydrolyzed to remove both acetate groupings and then treated with hydrogen in the presence of Raney nickel catalyst to reduce the nitro group to an amino group.

*Example 27*

2 grams of 1,8-dihydroxy-4,5-dinitroanthraquinone, 2 grams of m-(CHOHCH₂CH₃)aniline and 20 cc. of dioxane are reacted together in an autoclave at 140° C. for four hours. Upon working up the reaction mixture in accordance with Example 3 a dye compound is obtained which colors cellulose acetate textile materials blue shades.

The m-(CHOHCH₂CH₃)aniline was prepared by nitrating propiophenone and catalytically reducing the nitro and keto groups.

*Example 28*

2 grams of 1,8-dihydroxy-4,5-dinitroanthraquinone, 2.3 grams of 3-(2-and/or 4-amino-3-chlorophenyl)-1-propanol and 15 cc. of dimethylaniline are reacted together at 150° C. for five hours. Upon working up the reaction mixture in accordance with the procedure described in Example 3 a dye compound is obtained which colors cellulose acetate textile materials blue shades.

The amine used in the above reaction was prepared from m-(CH₂CH₂CH₂OH)aniline by replacing the amino group with chlorine (diazo reaction), acetylating, nitrating, reducing the nitro group to an amino group by means of hydrogen in the presence of Raney nickel catalyst and then hydrolyzing the ester with alcoholic HCl.

*Example 29*

2 grams of 1,8-dihydroxy-4,5-dinitroanthraquinone, 2 grams of a mixture of o- and p-(CHOHCHOHCH₃)aniline and 15 cc. of ethyleneglycol monoethyl ether are reacted together in accordance with the procedure described in Example 3. The dye compound obtained colors cellulose acetate textile materials blue shades.

The mixture of amines used in the above reaction was prepared by nitration, reduction and hydrolysis of the acetate of

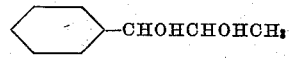

The preparation of this latter compound is described in Ber., vol. 17, page 709.

*Example 30*

2 grams of 1,8-dihydroxy-4,5-dinitroanthraquinone, 2 grams of a mixture of

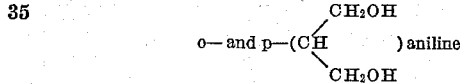

and 15 cc. of ethyleneglycol monoethyl ether are reacted together in accordance with the procedure described in Example 3. The dye compound obtained colors cellulose acetate textile materials blue shades.

The mixture of amines used in the above example was prepared by nitrating, reducing and hydrolyzing the acetate of

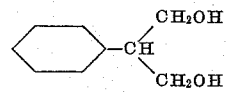

This latter compound was prepared according to J. A. C. S,. vol. 70, page 3121 (1948).

*Example 31*

3.28 grams of 1,8-dihydroxy-4,5-dinitroanthraquinone, 5 grams of m-(β-hydroxyethoxyethoxyethoxy)aniline and 25 cc. of diethylene glycol monoethyl ether are refluxed together for six hours. The reaction mixture is then cooled and poured into 100 cc. of cold 10% aqueous hydrochloric acid, with stirring. The dye compound which precipitates is recovered by filtration, washed with water until neutral and dried. It colors cellulose acetate textile materials blue shades.

By the use of an equivalent amount of m-(β-hydroxyethoxyethoxy)aniline and m-(β-ethoxyethoxyethoxy)aniline, respectively, in place of m-(β-hydroxyethoxyethoxyethoxy)aniline in the above example dye compounds are obtained which color cellulose acetate textile materials blue shades.

Compounds having the formulas:

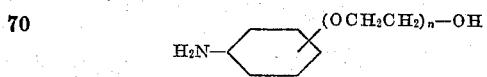

and

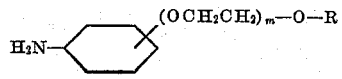

wherein m, n, and R have the meaning previously assigned to them are prepared in accordance with the general procedure described in U. S. Patent 2,391,011.

The p-(CH₂CH₂CH₂OH)aniline (M. P. 62° C.) used in Example 3 was obtained as crystals from the mixture of o- and p-(CH₂CH₂CH₂OH)aniline of Example 19 upon long standing.

The use of a solvent or diluent having the formula:

HOCH₂CH₂OQ wherein Q represents an alkyl group having 1 to 4, inclusive, carbon atoms, a β-hydroxyethyl group or a-CH₂CH₂OZ group, wherein Z represents an alkyl group having 1 to 4, inclusive, carbon atoms is described and claimed in copending Johnson and Wankel U. S. application Serial No. 242,441, filed August 17, 1951.

The new anthraquinone dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70°–90° C., but any suitable temperature can be used. Thus, the textile material such as cellulose acetate, for example, to be dyed or colored is ordinarily added to the dye bath at a temperature lower than that at which the main portion of the dyeing is to be effected, a temperature approximating 45° C.–55° C., for example, following which the temperature is raised to that selected for carrying out the dyeing operation. The temperature at which the dyeing is conducted may, of course, be varied somewhat, depending upon the particular material undergoing coloration.

As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

1. The anthraquinone compounds having the general formula:

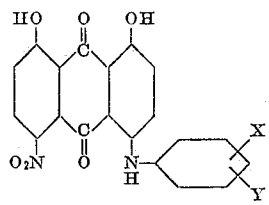

wherein X represents a member selected from the group consisting of the γ-hydroxypropyl group, the β-hydroxy-n-propyl group, the α-methyl-β-hydroxyethyl group, the α,α-dimethylcarbinol group, a dihydroxyalkyl group having three carbon atoms, a —(OCH₂CH₂)ₙ—OH group wherein n represents a whole number from 1 to 4, a —(OCH₂CH₂)ₘ—OCH₃ group and a

—(OCH₂CH₂)ₘ—OC₂H₅ group wherein m represents a whole number from 1 to 3 and Y represents a member selected from the group consisting of a hydrogen atom, a chlorine atom, a hydroxy group, a methoxy group and a methyl group.

2. The anthraquinone compounds having the general formula:

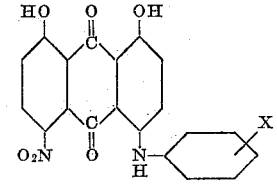

wherein X represents the β-hydroxy-n-propyl group.

3. The anthraquinone compounds having the general formula:

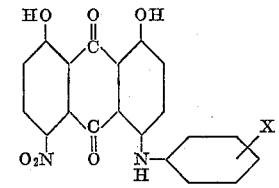

wherein X represents a dihydroxyalkyl group having three carbon atoms.

4. The anthraquinone compound having the formula:

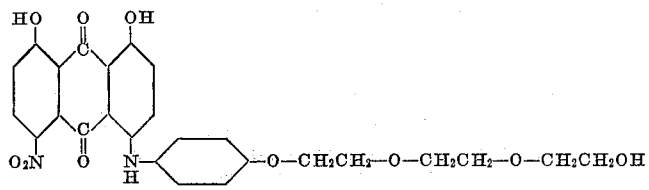

5. The anthraquinone compound having the formula:

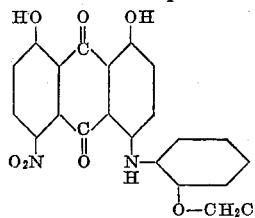

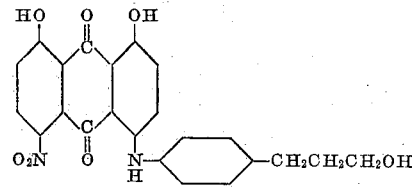

6. The anthraquinone compound having the formula:

7. The anthraquinone compound having the formula:

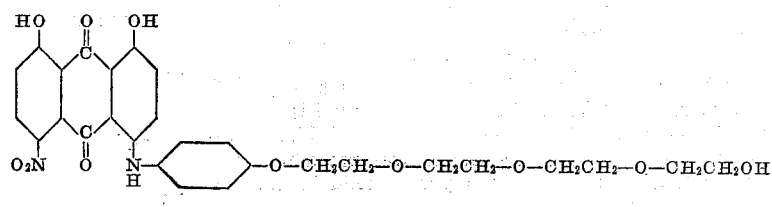

8. The anthraquinone compound having the formula:
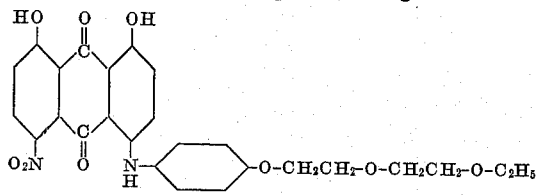
References Cited in the file of this patent
UNITED STATES PATENTS
| | | |
|---|---|---|
| 2,053,273 | Ellis et al. | Sept. 8, 1936 |
| 2,333,384 | Klein | Nov. 2, 1943 |
| 2,341,891 | Wuertz et al. | Feb. 15, 1944 |
| 2,391,011 | Dickey et al. | Dec. 18, 1945 |
| 2,480,269 | Seymour et al. | Aug. 30, 1949 |
| 2,485,197 | Grossmann | Oct. 18, 1949 |
| 2,487,045 | Dickey et al. | Nov. 8, 1949 |
| 2,510,088 | Dickey et al. | June 6, 1950 |
| 2,560,887 | Randall et al. | June 17, 1951 |
FOREIGN PATENTS
| | | |
|---|---|---|
| 492,697 | Great Britain | Sept. 26, 1938 |